United States Patent
Wullschleger et al.

(10) Patent No.: US 6,221,421 B1
(45) Date of Patent: Apr. 24, 2001

(54) EXTRUDED INTERMEDIATES CONTAINING A SOLUBLE FIBER AND FOOD PRODUCTS CONTAINING SAME

(75) Inventors: Richard D. Wullschleger, Portage; James B. Holder; Robins S. Dickmann, both of Battle Creek, all of MI (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 09/429,582

(22) Filed: Oct. 28, 1999

Related U.S. Application Data

(60) Division of application No. 09/186,561, filed on Nov. 5, 1998, which is a continuation-in-part of application No. 08/966,396, filed on Nov. 7, 1997, now abandoned.

(51) Int. Cl.[7] .................................................... A23L 2/39
(52) U.S. Cl. .................... 426/590; 426/599; 426/615; 426/629; 424/439
(58) Field of Search ........................... 426/590, 615, 426/629, 804, 599; 424/439, 78.01

(56) References Cited

U.S. PATENT DOCUMENTS

| | | | | |
|---|---|---|---|---|
| 4,551,331 | * | 11/1985 | Rudin | 426/549 X |
| 4,996,051 | * | 2/1991 | Meer et al. | 426/615 X |
| 5,009,916 | * | 4/1991 | Colliopoulos | 426/615 |
| 5,149,541 | * | 9/1992 | Leis, Jr. et al. | 426/629 X |

* cited by examiner

*Primary Examiner*—Milton Cano
(74) *Attorney, Agent, or Firm*—Howard & Howard

(57) ABSTRACT

Foodstuffs and drink mixes containing extruded fiber-containing intermediates are disclosed. The extruded intermediates include a soluble fiber source and an insoluble fiber source, and are useful in preparing baked goods, drink mixes, liquid drinks and other foodstuffs. Processes for preparing the intermediates and the foodstuffs and methods of lowering cholesterol with the foodstuffs are also disclosed.

6 Claims, No Drawings

EXTRUDED INTERMEDIATES CONTAINING A SOLUBLE FIBER AND FOOD PRODUCTS CONTAINING SAME

This application is divisional of U.S. application Ser. No. 09/186,561, filed Nov. 5, 1998 which is continuation-in-part of U.S. application Ser. No. 08/966,396 filed Nov. 7, 1997, now abandoned.

TECHNICAL FIELD

The present invention relates to an extruded product containing a soluble fiber and an insoluble fiber useful as an intermediate in the production of foodstuffs, e.g. drink mixes and baked food products. In preferred embodiments, the soluble fiber is provided by psyllium.

BACKGROUND OF THE INVENTION

Generally, there are two main types of known dietary fibers broadly classified as soluble fibers and insoluble fibers. Insoluble fibers are recognized for their bulk laxative effect, while soluble fibers are known to have a cholesterol-lowering effect. Certain natural grains, particularly farinaceous grains, contain both soluble and insoluble fibers, and are particularly useful as fiber sources because they can be manufactured into a wide variety of edible products for consumption. Insoluble fibers are generally found in the husk of the grain, while soluble fibers may be found in the husk or in other parts of the grain. Examples of soluble fibers that have been shown to have a cholesterol-lowering effect include, e.g. psyllium and β-glucan.

Psyllium an excellent source of both soluble and insoluble fibers, and has a proven cholesterol-lowering effect. Psyllium is known mucilaginous material derived from seeds from the plants of the Plantago genus, which grows in certain sub-tropical regions. The seeds are dark brown, smooth, boat shaped and shiny. In addition to its cholesterol lowering effects, psyllium is well known for its bulk laxative effect. Psyllium seed is used in whole, ground or dehusked form to make a variety of psyllium containing products, including cookies, laxative drink mixes, and other foodstuffs.

Psyllium is mucilagenous in nature and acquires a slimy or adhesive texture and mouthfeel upon hydration. This slimy mouthfeel is unpalatable and, accordingly, various additives have been incorporated in psyllium-containing ingestible compositions to mask the undesirable texture and mouthfeel of psyllium. In addition, psyllium develops a distinctive, undesirable flavor and color in the presence of heat and moisture which further limits its use in food and drink mix products.

The mucilagenous nature of psyllium husks and of soluble fibers in general presents grave processing difficulties and there have been numerous prior attempts to produce palatable, food and drink mix products. Difficulties notwithstanding, the desirable therapeutic effects provided by psyllium have led to many prior art psyllium-containing formulations. For example, various psyllium containing foodstuffs have been proposed which purport to take advantage of the natural digestion regulation properties of psyllium, or the satiating effect of psyllium. See, for example, U.S. Pat. Nos. 3,574,634 and 4,348,379.

It has also been suggested, e.g. in U.S. Pat. No. 3,148,114, that whole psyllium husks, such as the ground husks of the seed *Plantago psyllium*, lowers blood cholesterol upon oral administration thereof. U.S. Pat. No. 4,849,222 discloses a medicament composition for reducing blood cholesterol levels in humans and lower animals which comprises a mixture of psyllium seed gum, or source of psyllium seed gum, and a nonabsorbable, nondigestible polyol polyester.

Prior attempts have been made to overcome the problems of using psyllium in ready-to-eat cereal and bakery products such as cookies. U.S. Pat. No. 5,227,248, hereby incorporated by reference, describes preparation of an extruded psyllium nugget that is incorporated into cereal and baked products such as cinnamon cookies. The nuggets used were approximately ⅛ to ¼ inch in diameter.

The mucilagenous nature of psyllium and other soluble fibers provides particular difficulties in the preparation of psyllium-containing drink mix products. As noted above, psyllium gels when exposed to an aqueous environment, leading to palatability and stability problems such as poor suspendability. Attempts have been made to control the psyllium particle size, slow the gellation rate of psyllium in a liquid formulation by inclusion of, e.g. citric acid, and addition of suspending agents. Certain dry psyllium-containing formulations are commercially available, as liquid drink mixes have proven to have an inadequate shelf life for commercialization.

The present invention provides fiber-containing intermediates comprising a soluble fiber source and an insoluble fiber source that overcome the defeciencies associated with prior art products containing soluble fiber sources such as psyllium. The extruded intermediates are useful in preparing palatable foodstuffs, e.g. drink mix and baked good formulations. Methods of producing the intermediates are also described herein. The food and drink mix preparations, and even the intermediates themselves, are useful for reducing serum cholesterol levels upon administration to a mammal, e.g. a human. Additional objects and advantages of the present invention will become apparent from the following detailed description and examples thereof.

SUMMARY OF THE INVENTION

The present invention relates to fiber-containing foodstuffs, e.g. dry drink mixes, liquid drinks and baked products. Preferably, the products contain a sufficient quantity of a soluble fiber source to provide a cholesterol-reducing effect if ingested by humans and lower mammals (hereinafter referred to generically as mammals). The direct source for the soluble fiber is preferably psyllium in the form of the psyllium seed husk, whole psyllium seed or dehusked psyllium seed. When ingested, the fiber-containing food product effectively reduces the mammalian serum and/or liver cholesterol levels. Other therapeutic effects can also be achieved upon administration of the fiber containing products, e.g. laxative effects and lowered glycemic index.

The extruded intermediate is preferably an agglomeration of a soluble fiber source, an insoluble fiber source and other ingredients, e.g. starches, sweeteners, suspending agents, flavorants, gel-modifying agents and other processing aids. It has been found that food products containing the agglomerated intermediates have excellent flavor and textural characteristics and do not exhibit the slimy mouthfeel typical of prior art compositions.

For purposes of the present invention, the term "soluble fiber source" is defined herein as any natural or synthetic soluble fiber or soluble fiber-containing product, e.g. whole grains, portions of whole grains, and the like. Similarly, "insoluble fiber source" for purposes of the present invention is defined as any natural or synthetic insoluble-fiber or product containing an insoluble fiber. The insoluble fiber source can be the same as or different from the soluble fiber source. Preferably, the insoluble fiber source is the bran of a farinaceous grain, e.g. oat bran.

The present invention also relates to a novel process for producing the fiber-containing products. In a preferred embodiment, the fiber-containing intermediate is preferably formed by extruding the soluble fiber source together with the insoluble fiber source and optionally other ingredients such as starches, sweeteners, flavorants etc. to produce an intermediate nugget product, which may then milled to produce an intermediate of the preferred mean particle size (mps). A sufficient quantity of liquid, e.g. water may be added during the extrusion process to assist extrusion manufacture of the intermediate. The intermediate is then mixed with other ingredients using conventional techniques to produce the final product, e.g. liquid drinks or baked goods containing the intermediates.

The final products preferably contain a sufficient quantity of soluble fiber to produce desired in-vivo effects upon ingestion by a mammal, e.g. reduced serum and liver cholesterol levels, Taxation, etc.

DETAILED DESCRIPTION

The food products of the present invention may be produced utilizing a variety of different methods, depending on the desired form of the final product. For example, the production of baked goods, liquid drinks and drink mixes all require different process steps and equipment.

In a preferred embodiment, the food products contain an extruded fiber-containing intermediate that contains a soluble fiber source and an insoluble fiber source. Preferably, the intermediate comprises from about 25 to about 99% of a soluble fiber source, by dry wt, and also preferably contains from about 1 to about 75% by weight of an insoluble fiber source. The soluble fiber source and the insoluble fiber source may be derived from the same product, e.g. a farinaceous grain such as oats.

The soluble fiber source may be any natural or synthetic soluble-fiber or soluble fiber containing product. Suitable soluble fiber sources include psyllium, β-glucan, farinaceous grains, and mixtures thereof. Psyllium is a preferred source of soluble fiber. Preferably, psyllium is derived from the aforementioned sources. Alternatively, the psyllium source may be a pre-processed psyllium containing other ingredients, e.g. edible acids such as citric acid.

The insoluble fiber source may be any natural or synthetic insoluble fiber or a product containing such an insoluble fiber, e.g. a farinaceous grain. The insoluble fiber source may be the same as or different from the soluble fiber source. Preferred insoluble fiber sources include the whole farinaceous grains or brans of those grains. Suitable farinaceous grains are listed above with respect to soluble fiber sources. Generally, the insoluble fiber sources provide from about 1 to about 75% by weight of the intermediate product, and more preferably from about 5 to about 50%.

The fiber-containing intermediate may also include a starch source, preferably a cereal grain flour. Representative flours include oat flour, wheat flour, corn flour, rice flour, and combinations thereof. The starch source generally comprises from about 0 to about 50% by weight of the of the intermediate, and more preferably from about 1 to about 25% by wt. A preferred intermediate contains from about 1 to about 20% by weight rice flour, and additionally contains from about 1 to about 45% by weight of total flour derived from a different source, e.g. wheat or oat flour.

The intermediates may also contain simple sugars such as mono- and di-saccharides. Sucrose is preferred. The intermediate preferably comprises from about 0 to about 20% by weight of a simple sugar. Preferably, the intermediates include from about 1 to about 10% simple sugar by weight, and more preferably from about 1 to about 5%.

If the intermediate is to be used in the manufacture of a dry drink mix or a liquid drink, it is preferred that the intermediate includes an edible acid, e.g citric acid. Preferably, the intermediate includes from about 0.05 to about 5% by weight of an edible acid. Citric acid is preferred particularly when the intermediate includes psyllium. The citric acid acts as a flavorant, and also improves the color of the product.

It is also preferable to include an emulsifier in the intermediate. Lecithin is preferred, especially in solid form. A suitable solid lecithin is commercially available from Central Soya under the tradename Centrolex F. Preferably, lecithin comprises form about 0.1 to about 2.0 percent of the intermediate by weight, and more preferably from about 0.5 to about 0.75 percent.

The soluble fiber source in the finished product should be at least 1% by dry weight basis up to about 50% by dry weight basis. When formulated as a drink mix, psyllium is preferably present as from about 1 to about 24 of the dry weight of all components, and more preferably 4 to 16. It has been found that a drink mix formulation containing psyllium within these ranges has good flavor and textural characteristics.

When formulated as a flavored liquid drink, the soluble fiber preferably comprises from about 0.5% to about 4.0% wt./vol. of the liquid drink. Preferably, the liquid drink provides that 3.4 gms of psyllium per 8 oz. (approximately 240 mls) of liquid. This dose is approximately one-third of the recommended psyllium dose of 10 grams per day to reduce cholesterol levels. Thus, one would generally consume three 8 oz. portions of the liquid drink daily.

Recently, the United States Food and Drug Administration (USFDA) has found that a daily intake of 7 grams of soluble fiber from psyllium husk or psyllium seed husk as part of a diet low in saturated fat and cholesterol may reduce the risk of coronary heart disease (CHD) by lowering blood total- and LDL cholesterol levels in individuals with mild to moderate hypercholesterolemia. In view of this finding, the USFDA authorizes placement of a CHD health claim in labeling of foods containing a minimum of 95% pure soluble fiber per Reference Amount Customarily Consumed (RACC, 7 grams divided by 4 eating occasions per day). The USFDA has adopted the terms "psyllium husk" or "psyllium seed husk" to define soluble fiber.

The particle size of the intermediate has been found to be an important factor in preparing suitable end products. generally, the mean particle size should be between 25 and 425 microns.

For purposes of the present invention, the mean particle size was determined by performing a standard screen analysis to separate the intermediate particles. The analysis is conducted by passing a known weight of intermediate particles through a series of different sized sieves. The percent of particles retained on each size sieve is determined, and the percent is multiplied by the sieve opening in microns. The calculated values are added and the total of these values represents the mean particle size in microns.

It has been discovered that to prepare a palatable drink mix formulation, the mean particle size distribution of the psyllium-containing intermediate should preferably be within certain well-defined limits. If the particle size of the intermediate is to large, the drink mix is too gritty and has poor suspension qualities. If the particle size is too small, the resultant drink mix acquires an unpalatable mouth-feel, presumably from the faster gellation of the psyllium suspension. When used to prepare a drink mix or liquid drink according to the present invention, it is preferred that the intermediate has a mean particle size of from about 30 to about 180 microns, with a range of from about 75 to about 125 microns being preferred.

If the psyllium-containing intermediates used in a baked product, preferably the mean particle size of from about 30 to about 425 microns, more preferably from about 50 to about 300 microns, and most preferred is from about 100 to about 250 microns. With bakery products, it has been found that using an intermediate with a larger mean particle size leads to an unacceptably gritty product and a bland flavor. Use of smaller particles leads to a product having an unacceptably gummy consistency. It has been discovered that using an intermediate within the preferred particle size distribution produces a product that initially has a gritty texture. However, the psyllium apparently hydrates in the baked product after approximately one day of equilibration. After equilibrium no longer has a gritty mouthfeel. This hypothesis is offered by way of explanation only, and is not intended to limit the scope of the claimed invention.

The fiber-containing intermediates of the present invention may be produced by wet extruding a mixture comprising from about 25 to about 99% by weight of a soluble fiber source; and from about 1 to about 75% by weight of an insoluble fiber source; drying the extrudate to a water content of from about 3 to about 12 percent by weight; and milling the dried extrudate to obtain particles having a mean particle size of from about 25 to about 425 microns.

In a preferred embodiment, the requisite amounts of psyllium and other dry ingredients are pre-blended using, e.g. a Hobart mixer. The blend is then fed into an extruder. A twin-screw extruder is preferred. A sufficient quantity of liquid is introduced into the extruder to form a wet mass. The action of the extruder blends the wet mass and feeds the mass through the zones of the extruder. The extruder has a heating zone which cooks the wet mass, which is then extruded and cut into nuggets using a chopper/impeller. The nuggets generally have a water content of from about 25 to about 45% by weight. The nuggets are then dried and milled to obtain an intermediate having the desired particle size distribution and/or mean particle size. The intermediate is then mixed with other ingredients using conventional processing techniques to obtain the final psyllium-containing product. The processing techniques will vary with the desired final product.

It will be understood that any of the ingredients may be pre-blended when producing the intermediate to avoid or reduce the need to add such ingredients during the final processing steps.

A suitable extruder for use in accordance with the present invention is a WP-57 twin screw extruder commercially available from Werner and Pfleiderer. The extruder has at least one and preferably four heating zones, and has an inlet for introducing liquids such as water into the mixture to be extruded.

In use, general extruder settings are as follows: the flour, i.e. dry mix, feed rate is set at from about 4–5 pounds per minute, and the water feed rate is set to from about 0.1 to about 2.0 lbs per minute. The cutter speed is set at from about 700 to about 1200 rotations per minute (rpm), and the die pressure is generally in the range of from about 1500 to about 2000 pounds per square inch (psi). Barrel temperatures are set to approximately 100 to about 400° F. The screw speed is set at from about 300 to about 400 rpm.

If the final product is a baked good, the intermediate will be mixed with other conventional baking ingredients and then baked to provide the final product.

If a powdered drink mix is desired, the intermediate will be blended with flavorants, suspending agents and the like to produce the final dry mix product.

To produce a liquid drink, the intermediate will be mixed with a liquid, e.g. water, along with other ingredients such as flavorants and suspending agents to produce the final liquid drink product.

The following non-limiting examples set forth preferred embodiments of the invention.

EXAMPLES

Examples 1–5

Extruded psyllium-containing intermediates were prepared having the following formulations:

EXAMPLE 1

| INGREDIENTS | WEIGHT (lbs.) | % (by wt.) |
|---|---|---|
| Psyllium (raw milled, 40 mesh) | 167 | 75.49729 |
| Oat Bran | 33 | 14.91863 |
| Rice Flour | 11 | 4.97288 |
| Sucrose | 10 | 4.5208 |
| Annatto Color | 0.2 | 0.9042 |
| TOTALS | 221.2 | 100 |

EXAMPLE 2

| INGREDIENT | WEIGHT (LBS.) | % DRY BLEND (BY WT.) |
|---|---|---|
| Psyllium (raw milled, 40 mesh) | 163.9 | 75% |
| Oat bran | 17.8 | 8.0% |
| Oat Flour | 15.4 | 7.0% |
| Rice Flour | 11.1 | 5.0% |
| Sucrose | 9.3 | 4.65% |
| Lecithin (Centrolex F) | 0.5 | 0.25% |
| TOTALS | 218.2 | 100 |

EXAMPLE 3

| INGREDIENT | WEIGHT (lbs.) | % DRY BLEND (by wt.) |
|---|---|---|
| Psyllium (raw milled, 40 mesh) | 163.9 | 75% |
| Oat Bran | 17.8 | 8 |
| Wheat Flour | 15.9 | 7 |
| Rice Flour | 11.1 | 5 |
| Sucrose | 9.3 | 4.65 |

EXAMPLE 3 -continued

| INGREDIENT | WEIGHT (lbs.) | % DRY BLEND (by wt.) |
|---|---|---|
| Lecithin (Centrolex F) | 0.5 | 0.25 |
| TOTALS | 218.7 | 100.247 |

EXAMPLE 4

| INGREDIENT | WEIGHT (lbs.) | % DRY BLEND (by wt.) |
|---|---|---|
| Psyllium (raw milled, 40 mesh) | 163.9 | 75 |
| Wheat bran, lt. white | 34.5 | 15 |
| Rice Flour | 11.1 | 5 |
| Sucrose | 9.3 | 4.65 |
| Lecithin (Centrolex F) | 0.5 | 0.25 |
| TOTALS | 219.5 | 100 |

EXAMPLE 5

| INGREDIENTS | WEIGHT (lbs.) | % DRY BLEND (by wt.) |
|---|---|---|
| Psyllium (raw milled, 40 mesh) | 163.9 | 75 |
| Wheat Bran, light white | 33.3 | 15 |
| Rice Flour | 11.1 | 5 |
| Sucrose | 9.3 | 4.65 |
| Citric Acid | 1.1 | 0.5 |
| Lecithin (Centrolex F) | 0.5 | 0.25 |
| TOTALS | 219.2 | 100 |

The psyllium-containing intermediates of Examples 1–5 were prepared as follows. All ingredients were dry blended in a Blanco mixer for 15 minutes. The mix was processed through a WP-57 twin screw extruder using an All Brand® die. The WP-57 settings are as follows: flour feed rate 2.50–4.25 lbs/min; water feed rate 1.70 to 1.80 lbs/min; screw speed 340–350 rpm; cutter speed 370 to 400 rpm; torque 25–36%; barrel temperatures between about 145° F. to about 245° F. The die was at about 1600 to 1900 psi. The food temperature was between 230 and 260 degrees. The resultant nuggets were dried on vat to a 3% moisture content at 210° F. for 30 minutes. The product was then tempered overnight in a cold room. The nuggets were then ground twice, once through a Fitzmill #1 screen, and then once through a #00 screen.

After milling, the intermediates of Examples 1–5 were found to have a mean particle size of about 138 microns. The intermediate particle size of Example 5 were then milled through a 0.5 mm screen using a cyclotech mill. The mean particle size of the triple-milled Example 5 intermediate was found to be 115 microns.

Example 6

The psyllium-containing intermediate of Example 1 was used to prepare a drink mix having the following formulation:

EXAMPLE 6

| INGREDIENT | WEIGHT (grams) | % BY WEIGHT |
|---|---|---|
| Milk, fresh at 2% bf. | 196.00 | 82.50200 |
| Corn, Flour, hydrolyzed (Maltrin 100) | 23.80 | 10.01810 |
| Sucrose | 8.67 | 3.64945 |
| Salt, common NaCl | 0.40 | 0.16837 |
| Malt Syrup | 3.00 | 1.26279 |
| Vanilla | 0.70 | 0.29465 |
| Intermediate of Example 1 (mps 138 microns) | 4.00 | 1.68371 |
| Lecithin | 0.1 | 0.42093 |
| TOTALS | 237.57 | 100.00 |

The drink was prepared by mixing all ingredients in a blender for 2 minutes. The drink was placed in a container and refrigerated.

Examples 7–9

The psyllium-containing intermediate of Example 5 was then used to prepare flavored drinks having the following formulations:

EXAMPLE 7

| INGREDIENT | POUNDS | GALLONS | PERCENT |
|---|---|---|---|
| Water | 365 | 43.76 | 82.19587 |
| 55% High Fructose Corn Syrup | 58.75 | 5.88 | 13.23016 |
| White grape juice concentrate | 10 | 1 | 2.25194 |
| Citric Acid | 1.46 |  | 0.32878 |
| Lemon Flavor | 0.6 | 0.06 | 0.13512 |
| Orange Flavor | 0.5 | 0.05 | 0.1126 |
| Grapefruit flavor | 0.15 | 0.02 | 0.03378 |
| Yellow #5 | 0.424 grams |  | 0.00028 |
| Intermediate of Example 5 (mps 138 microns) | 7.6 |  | 1.71148 |
| TOTAL | 444.06 | 50.76 | 100.00 |

EXAMPLE 8

| INGREDIENT | POUNDS | GALLONS | PERCENT |
|---|---|---|---|
| 55% high fructose corn syrup | 78.65 | 7.87 | 15.73000 |
| Strawberry Juice Conc. | 0.15 | 0.02 | 0.03 |
| Lemon Juice Conc. | 7.35 | 0.74 | 1.47000 |
| Lemon flavor | 0.25 | 0.03 | 0.05 |
| Strawberry flavor | 0.70 | 0.07 | 0.14000 |
| Lemon Emul. (Clouding Agent) | 3.65 | 0.37 | 0.73 |
| Cochineal Red | 0.15 |  | 0.03000 |

-continued

EXAMPLE 8

| INGREDIENT | POUNDS | GALLONS | PERCENT |
|---|---|---|---|
| Ascorbic Acid | 0.05 | | 0.01 |
| Intermediate of Example 5 (mps 138 microns) | 8.50 | | 1.70000 |
| Water | 400.55 | 48.03 | 80.11 |
| TOTAL | 500.00 | 57.10 | 100.00 |

The psyllium-containing liquid drinks of Examples 8 and 9 were prepared by blending all ingredients were added together and mixed to until a uniform suspension was attained.

Example 9

A flavored dry drink mix was prepared using the following ingredients:

EXAMPLE 9

| INGREDIENTS | % BY WEIGHT |
|---|---|
| Sugar | 78.59 |
| Citric Acid | 2.74 |
| Lemon Flavor Natural | 0.66 |
| Strawberry Flavor | 4.87 |
| Cochineal Red | 0.05 |
| Ultrasperse M | 4.87 |
| Strawberry Dry Fruit | 8.22 |
| TOTAL | 100.00 |

The above ingredients are blended in a Hobart mixer until uniformly mixed, and the intermediate of Example 5 (mps 115 microns) is added so that each 8 ounces of hydrated beverage would deliver 3.4 grams of the Example 5 intermediate. Blending that mixture with 8 ounces of cold water results in a pleasant tasting beverage that does not gel over an extended time period.

Example 10

An psyllium-containing intermediate for use in baking was prepared having the following formulation:

EXAMPLE 10

| INGREDIENT | WEIGHT (lbs.) | % BY WEIGHT |
|---|---|---|
| Raw Milled Psyllium, 40 mesh | 501.00 | 75.56561 |
| Oat Bran, CanAgra SCM 500 | 99.0 | 14.93213 |
| Rice Flour | 33.00 | 4.97738 |
| Sugar | 30.00 | 4.52489 |
| TOTALS | 663.00 | 100.00 |

All ingredients are mixed in a Blanco for 15 minutes. The flour mix is processed through WP-57 using All Bran die. The WP-57 settings are as follows: flour feed rate 3.00–3.25 lbs/min; water feed rate 1.70 to 2.15 lbs/min; screw speed 320–345 rpm; cutter speed 1500 to 2850 rpm; torque 42–45; barrel temperatures between about 145 ° F. to about 245 ° F., and the die press was set at form about 1800 to about 2200 psi. The food temperature ranged from about 325 to about 345 The WP-57 settings are as follows: flour feed rate 3.00–3.25 lbs/min; water feed rate 1.70 to 2.15 lbs/min; screw speed 320–345 rpm; cutter speed 1500 to 2850 rpm; torque 42–45; barrel temperatures between about 145° F. to about 245° F. The products were dried on vat to a moisture content of 3% at 210° F. for 30 minutes. The extrudate is then ground in a Fitzmill using a #1 screen.

The mean particle size was found to be 175 microns.

Examples 11–14

Muffins were prepared using the extruded psyllium of Example 10 as follows:

EXAMPLE 11

| INGREDIENT | WEIGHT (grams) | % BY WEIGHT |
|---|---|---|
| Bread Flour | 252.0 | 22.60 |
| Sugar, granulated | 174.0 | 15.60 |
| Bananas | 177.0 | 15.87 |
| Water | 336.0 | 30.13 |
| Applesauce, sweetened | 47.0 | 4.21 |
| Canola Oil | 22.0 | 1.97 |
| Intermediate of Example 10 | 54.5 | 4.89 |
| Cocoa/Liquor Mix | 14.0 | 1.26 |
| Cocoa, Dutch processed | 9.0 | 0.81 |
| Baking Soda | 5.0 | 0.45 |
| Banana Flavor | 1.6 | 0.14 |
| Baking Powder | 4.5 | 0.40 |
| Flour Salt | 2.7 | 0.24 |
| Vanilla | 1.6 | 0.14 |
| Egg White Powder | 10.0 | 0.90 |
| Panodan | 2.7 | 0.24 |
| McCormick German Chocolate Flavor | 1.6 | 0.14 |
| TOTALS | 1115.0 | 100.00 |

EXAMPLE 12

| INGREDIENT | WEIGHT (grams) | % BY WEIGHT |
|---|---|---|
| Bread Flour | 163.9 | 22.44 |
| Sugar, granulated | 174.0 | 15.49 |
| Bananas | 177.0 | 15.76 |
| Water | 336.0 | 29.91 |
| Applesauce, sweetened | 47.0 | 4.18 |
| Canola Oil | 30.0 | 2.67 |
| Intermediate of Example 10 | 54.5 | 4.85 |
| Cocoa/Liquor Mix | 14.0 | 1.25 |
| Cocoa, Dutch processed | 9.0 | 0.80 |
| Baking Soda | 5.0 | 0.45 |
| Banana Flavor | 1.6 | 0.14 |
| Baking Powder | 33.3 | 0.40 |
| Flour Salt | 11.1 | 0.24 |
| Vanilla | 1.6 | 0.14 |
| Egg White Powder | 9.3 | 0.89 |
| Panodan | 219.2 | 0.24 |
| German Chocolate Flavor | 1.6 | 0.14 |
| TOTALS | 1123.0 | 100.00 |

EXAMPLE 13

| INGREDIENT | WEIGHT (grams) | % BY WEIGHT |
|---|---|---|
| White Satin Pastry Flour | 290.0 | 24.52 |
| Sugar | 100.0 | 8.45 |
| Whey Powder, sweet | 18.0 | 1.52 |
| Egg White Powder | 9.5 | 0.80 |
| Baking Soda | 6.0 | 0.51 |
| Flour Salt | 2.5 | 0.21 |
| SAPP 28 | 2.0 | 0.17 |
| MCP | 0.8 | 0.07 |
| Water | 300.0 | 25.36 |
| Applesauce, unsweetened | 0.0 | 0.00 |
| Invert Syrup .76 | 50.0 | 4.23 |
| 55% High fructose corn syrup | 170.0 | 14.37 |
| Butter Flavor | 1.0 | 0.08 |
| Blueberry Flavor | 3.0 | 0.25 |
| Blueberries, no bleed | 150.0 | 12.68 |
| Cinnamon | 25.0 | 2.11 |
| Intermediate of Example 10 | 55.0 | 4.65 |
| Panodan SK | 0.6 | 0.05 |
| Durem 204 | 2.4 | 0.20 |
| TOTALS | 1182.8 | 100.00 |

EXAMPLE 14

| INGREDIENT | WEIGHT (grams) | % BY WEIGHT |
|---|---|---|
| Bread Flour, high rise | 252.0 | 20.16 |
| Sugar, granulated | 338.0 | 27.05 |
| Cocoa | 50.0 | 4.00 |
| Egg White Powder | 10.0 | 0.80 |
| Baking Soda | 5.0 | 0.40 |
| Baking Powder | 4.5 | 0.36 |
| Flour Salt | 2.7 | 0.22 |
| Water | 350.0 | 28.01 |
| Applesauce, sweetened | 150.0 | 12.00 |
| Beta Trim | 5.0 | 0.40 |
| Panodan | 3.5 | 0.28 |
| Vanilla | 2.0 | 0.16 |
| Canola Oil | 25.0 | 2.00 |
| Intermediate of Example 10 | 52.0 | 4.16 |
| TOTALS | 1250.0 | 100.00 |

The muffins of examples 11–14 were prepared by mixing the psyllium intermediate of Example 10 with the oil, and separately mixing the dry ingredients. The Example 10 psyllium intermediate/oil blend was added to the dry blend just prior to the final mix. The mix was then poured into muffin shaped pans and baked at 350° F. until finished.

The muffins of Examples 11 to 14 had acceptable flavor and texture characteristics.

Example 15

For comparative purposes, a muffin was made replacing the intermediate of Example 10 with milled psyllium.

EXAMPLE 15

| INGREDIENT | WEIGHT (grams) | % BY WEIGHT |
|---|---|---|
| Bread Flour | 252.0 | 22.83 |
| Sugar, granulated | 174.0 | 15.77 |
| Bananas (#7 yellow flecked brown) | 177.0 | 16.04 |
| Water | 336 | 30.44 |
| Applesauce, sweetened | 47 | 4.26 |
| Canola Oil | 22 | 1.99 |
| Psyllium 40 mesh, milled | 43 | 3.90 |
| Cocoa/Liquor Mix | 14 | 1.27 |
| Cocoa, Dutch processed | 9 | 0.82 |
| Baking Soda | 5 | 0.45 |
| Banana Flavor | 1.6 | 0.14 |
| Flour salt | 2.7 | 0.24 |
| Vanilla | 1.6 | 0.14 |
| Egg White Powder | 10.0 | 0.91 |
| Panodan | 2.7 | 0.24 |
| German chocolate flavor | 1.6 | 0.14 |
| TOTALS | 1104.0 | 100.00 |

The muffins of Example 15 were prepared according to the methods set forth for Example 11–14, replacing the intermediate of Example 10 raw 40 mesh psyllium.

The muffin of Example 15 had an acceptable surface appearance, but did not raise as high as those of Examples 11–14. Additionally, this muffin had a gritty mouth feel.

The milled psyllium provided processing difficulties. Milled psyllium is very bulky, made the mixing difficult and the dough did not flow smoothly compared to Examples 11–14.

In Examples 16 and 17, a comparison study was done to test the effect a change in particle size of the intermediate of Example 10 would have on the muffins. The muffins were prepared as set forth in Example 11 above, and had the following formulation:

EXAMPLE 16

| INGREDIENT | WEIGHT (grams) | % BY WEIGHT |
|---|---|---|
| White Satin Pastry Flour | 350 | 20.40 |
| Sugar, Granulated | 420 | 23.80 |
| Polar P Gel | 10 | 0.57 |
| Cocoa, Dezaan Dark | 30 | 1.70 |
| Cocoa, Natural | 30 | 1.70 |
| Egg White Powder | 10 | 0.57 |
| Baking Soda | 13.5 | 0.76 |
| Sapp 28 | 1.2 | 0.24 |
| MCP | 2.1 | 0.12 |
| Flour Salt | 3 | 0.17 |
| Water | 575 | 32.58 |
| Applesauce, Sweetened | 170 | 9.63 |
| Vanilla (McCormick) | 0 | 0.00 |
| Chocolate Flavor | 7.5 | 0.42 |
| Canola Oil | 37.5 | 2.12 |
| Intermediate of Example 10 | 84 | 4.76 |
| Panodan | 0.9 | 0.05 |
| Durem 204 | 3.6 | 0.20 |
| TOTALS | 1765.0 | 100.00 |

The intermediate of Example 16 was prepared in accordance with Example 10, except the intermediate was milled to a mean particle size of 138 microns.

The muffins had a slightly reddish color and no flavor. The crumb structure was compact, tough and rigid. The product was unacceptable for commercialization.

EXAMPLE 17

| INGREDIENT | WEIGHT (grams) | % BY WEIGHT |
|---|---|---|
| White Satin Pastry Flour | 375 | 21.37 |
| Sugar, Granulated | 435 | 24.79 |
| Polar P Gel | 9 | 0.51 |
| Cocoa, Dezaan Dark | 32 | 1.82 |
| Cocoa, Natural | 32 | 1.82 |
| Egg White Powder | 12 | 0.68 |
| Baking Soda | 13.5 | 0.77 |
| Sodium acid pyrophosphate (Sapp) 28 | 4.2 | 0.24 |
| monocalcium phosphate (MCP) | 2.1 | 0.12 |
| Flour Salt | 3 | 0.17 |
| Water | 550 | 31.34 |
| Applesauce, Sweetened | 157 | 8.95 |
| Vanilla | 4 | 0.23 |
| Canola Oil | 37.5 | 2.14 |
| Intermediate of Example 10 | 84 | 4.79 |
| Panodan | 0.39 | 0.05 |
| Durem 204 | 3.6 | 0.21 |
| TOTALS | 1755.0 | 100.00 |

Example 17 was prepared using the same ingredients as Example 16, except that the mean particle size of the intermediate was as for Example 10, i.e. 175 microns.

Compared to the muffins of Example 16, the muffins had a much improved crumb structure and were not as rigid. The color remained a reddish brown. This product was acceptable.

Example 18

A blueberry muffin was prepared using the following ingredients:

EXAMPLE 18

| INGREDIENT | WEIGHT (grams) | % BY WEIGHT |
|---|---|---|
| Sugar | 105.00 | 13.85115 |
| Egg White Powder | 3.00 | 0.39575 |
| Salt | 1.50 | 0.19787 |
| Whey | 11.25 | 1.48405 |
| Bakery Vitamin/Mineral Pre-Mix | 0.60 | 0.07915 |
| 42% High Fructose Corn Syrup | 120.00 | 15.82988 |
| Blueberry Flavor | 1.88 | 0.24800 |
| Butter Flavor | 0.70 | 0.09234 |
| Water | 202.00 | 26.64697 |
| Sodium Aluminum Phosphate | 1.70 | 0.22426 |
| Dicalcium Phosphate Dihydrate | 0.40 | 0.05277 |
| Sodium Bicarbonate | 2.00 | 0.26383 |
| Polar Tex 12641 | 3.13 | 0.41290 |
| Cake Flour | 75.00 | 9.89368 |
| Bread Flour | 110.00 | 14.51072 |
| Panodan | 0.40 | 0.05277 |
| Durem 204 | 1.50 | 0.19787 |
| Canola Oil | 16.50 | 2.17661 |
| Intermediate of Example 10 | 35.00 | 4.61705 |
| Frozen Blueberries | 62.50 | 8.24473 |
| Low-Fat Granola | 30 | 4.00000 |
| TOTALS | 758.06 | 100.00000 |

The muffins were prepared by mixing the oil and intermediate of Example 10 together and setting aside. All liquid dry ingredients were blended together for 2 minutes and set aside for 10 minutes. The Example 10 intermediate/oil blend was added to the blended ingredients and mixed at low speed for one minute. The mixture was divided into 96 grams portions, and each was topped with 4 grams of granola topping. The portions were then baked at 400° F. for 25 minutes to produce 86 gram muffins.

Example 19

A chocolate dessert cake was prepared having the following ingredients:

EXAMPLE 19

| INGREDIENT | WEIGHT (grams) | % BY WEIGHT |
|---|---|---|
| White Satin Pastry Flour | 364.00 | 20.67712 |
| Sugar, Granulated | 496.00 | 28.17541 |
| Polar P Gel | 9.00 | 0.51125 |
| Cocoa-Dezaan Dark | 31.00 | 1.76096 |
| Cocoa | 31.00 | 1.76096 |
| Egg White Powder | 15.00 | 0.85208 |
| Baking Soda | 7.60 | 0.43172 |
| Baking Powder | 6.80 | 0.38623 |
| Monocalcium Phosphate | 0.00 | 0.00000 |
| Flour Salt | 4.00 | 0.22722 |
| Water | 490.00 | 27.83458 |
| Applesauce, Unsweetened | 171.00 | 9.71370 |
| Vanilla Cream Flavor | 2.00 | 0.11361 |
| Chocolate Flavor | 7.50 | 0.42604 |
| Canola Oil | 37.00 | 2.10180 |
| Intermediate of Example 10 | 84.00 | 4.77164 |
| Panodan | 0.90 | 0.05112 |
| Durem 204 | 3.60 | 0.20450 |
| TOTALS | 1760.40 | 100.00000 |

The dessert cake was prepared by blending the oils and the intermediate of Example 10, and setting aside. All dry ingredients were blended. The liquid ingredients were mixed with the blended dry ingredients for 2 minutes, and the resultant mixture was set aside. The oil/Example 10 intermediate blend was added to the mixed ingredients and mixed for 1 minute at low speed. The mixture was divided into 95 gram portions which were baked at 400° F. for 25 minutes to produce the final 86 gram dessert cake.

Examples 20 to 23

A carrot cake is prepared having the following formula:

TABLE 20

| Carrot Cake with Icing Ingredients | GRAMS |
|---|---|
| Sugar | 20.30 |
| Cream Cheese Flavor Icing | 13.24 |
| Bread flour | 12.76 |
| IQF Carrots | 11.60 |
| Water | 19.14 |
| Cake Flour | 7.54 |
| Applesauce, unsweetened | 4.64 |
| 42% High fructose Corn syrup | 4.64 |
| Midget Raisins | 4.35 |
| Intermediate of Example 10 | 3.69 |
| Canola Oil | 2.61 |
| Fluid Cake Shortening | 2.61 |
| Keebler Bran | 2.15 |
| Baking powder | 0.46 |
| Sodium bicarbonate | 0.35 |
| Polar Tex 12641 starch | 0.34 |

TABLE 20-continued

| Carrot Cake with Icing Ingredients | GRAMS |
|---|---|
| Egg white powder | 0.34 |
| Cinnamon | 0.24 |
| Salt | 0.17 |
| Bakery Vitamin/mineral Premix | 0.07 |
| Art 10X Vanilla | 0.02 |
| Aquaresin cinnamon 29-01-19 | 0.01 |
| Total | 111.29 |

The carrot cake was prepared as follows: The baking psyllium was combined with canola oil and emulsifiers in a Hobart mixer prior to the batter preparation. A batter was then prepared in three stesp. First, sugar, egg white solids, salt, vitamin premix, high fructose corn syrup, frozen carrots and flavors were mixed. Finally, the psyllium intermediate of Example 10 is added to the mixer. After the third mixing step, the batter was transferred to a surge tank. The batter was deposited into pans. The pans were sprayed with a release agent prior to depositing the batter into the pans. Product was baked, cooled and depanned prior to freezing. The frozen product was packed and the packed product was stored under freezing conditions.

Example 21

Apple-cinnamon flavored loaves are prepared using a method similar to that described in example 20 above. The formula is set forth as follows:

TABLE 21

| Apple Cinnanion Loaves Ingredients | Grams |
|---|---|
| Sugar | 27.02 |
| Bread flour | 16.98 |
| Water | 23.91 |
| Cake flour | 10.04 |
| IQF Apples | 9.65 |
| Applesauce, unsweetened | 6.18 |
| 42% High fructose Corn syrup | 6.18 |
| Intermediate of Example 10 | 4.37 |
| Low Fat Granola Topping | 3.86 |
| Keebler Bran | 2.86 |
| Canola Oil | 2.79 |
| Quick Oats | 1.47 |
| Natural Apple flavor | 0.85 |
| Baking powder | 0.54 |
| Sodium bicarbonate | 0.55 |
| Polar Tex 12641 starch | 0.45 |
| Cinnamon | 0.42 |
| Durem 204 | 0.23 |
| Egg white powder | 0.22 |
| Salt | 0.22 |
| Bakery Vitamin/mineral Premix | 0.09 |
| Panodan SDK | 0.06 |
| Aquaresin cinnamon 29-01-19 | 0.02 |
| Total | 118.97 |

These loaves had excellent taste and mouthfeel.

Example 22

Lemon poppy seed loaves were prepared using the method of example 20 and have the following formula:

TABLE 22

| Lemon Poppyseed Loaves Ingredients | For 100# F.F. |
|---|---|
| Sugar | 23.94 |
| Bread Flour | 19.95 |
| Water | 28.81 |
| Cake Flour | 12.77 |
| Applesauce, unsweetened | 11.17 |
| 42% High fructose Corn syrup | 7.98 |
| Intermediate of Example 10 | 4.55 |
| Low Fat Granola Topping | 3.99 |
| Canola Oil | 2.55 |
| Poppy Seeds | 0.96 |
| Nat sour cream flavor #50 | 0.96 |
| Myvatex 40-06S | 0.96 |
| Art Butter Flavor | 0.51 |
| Polar Tex 12641 starch | 0.49 |
| Sodium Bicarbonate | 0.45 |
| SODIUM ACID PYROPHOSPHATE 28 | 0.30 |
| Egg white powder | 0.23 |
| Salt | 0.22 |
| Mono Calcium phosphate | 0.12 |
| Bakery Vitamin/mineral Premix | 0.10 |
| lemon extract 9/70K406 | 0.05 |
| Yellow color 841 | 0.02 |
| Lemon Oil | 0.02 |
| Total | 121.11 |

The lemon poppy seed loaves had superior taste and excellent mouthfeel.

Example 23

Blueberry loaves are prepared according to the method of Example 20 except that frozen blueberries were injected into the batter prior to depositing. The formula is shown in the Table below:

TABLE 23

| Blueberry Loaves Ingredients | For 100# F.F. |
|---|---|
| Sugar | 23.48 |
| Bread water | 18.35 |
| Water | 14.68 |
| Cake Flour | 11.74 |
| Water | 11.30 |
| IQF Cultivated Blueberries | 10.13 |
| 42% High fructose Corn syrup | 5.87 |
| Intermediate of Example 10 | 3.96 |
| Low Fat Granola Topping | 3.52 |
| Canola Oil | 2.72 |
| Myvatex 40-06S | 0.88 |
| PolarTex 12641 starch | 0.43 |
| Sodium Bicarbonate | 0.42 |
| SODIUM ACID PYROPHOSPHATE 28 | 0.27 |
| Egg white power | 0.22 |
| Salt | 0.22 |
| Blue flavor 294392-V | 0.17 |
| Artificial Butter flavor | 0.15 |
| Mono Calcium phosphate | 0.11 |
| Bakery Vitamin/mineral Premix | 0.09 |
| Total | 108.70 |

The blueberry loaves were prepared in accordance with techniques described hereinabove and were shown to have excellent taste and mouthfeel.

Example 24

A study was conducted to test the cholesterol lowering efficacy of a psyllium-containing product according to the present invention using the hypercholesterolemic Golden Syrian male hamster model. The diets fed were high in total and saturated fat. There were two controls: the positive (+) (hypercholesterolemic) control was also fed cholesterol, and the negative (−) (normal cholesterol) control was not fed cholesterol. The fiber source was AACC Soft White Wheat Bran.

The two-test diet also included cholesterol. Test 1 had raw psyllium as its test fiber, and Test 2 had the extruded psyllium intermediate of Example 5. Soluble fibers from the test materials was fed at 5% of the diet. The total cholesterol levels at the end of the study were as follows:

−control 3.84±0.36

+control 5.57±0.38 raw psyllium (Test 1) 3.62±0.45

Example 5 (Test 2) 4.14±0.45

The addition of cholesterol to the diets caused a 45% higher cholesterol level versus the negative control, confirming the appropriateness of the hypercholesterolemic control. Raw psyllium resulted in a 35% lower total cholesterol and the extruded intermediate of Example 5 showed a 25% lower cholesterol level than the positive control.

The results show that the two materials, i.e. raw psyllium and the psyllium containing intermediate of Example 5 show good cholesterol lowering efficacy and are appropriate for use in cholesterol lowering products of the invention.

While not intending to be bound by any scientific theory, it is believed that the active psyllium ingredient for the psyllium enriched drink mix and bakery products of the present invention is the mucilaginous water soluble complex carbohydrate material. This soluble gum is concentrated in the psyllium seed husk. By processing the psyllium in accordance with the present invention, the therapeutic benefits possible from ingesting the psyllium gum can be achieved while at the same time masking the organoleptic drawbacks associated with prior attempts to incorporate psyllium in other types of food and drink mix products.

In addition to the hypocholesterolemic effect of the psyllium-containing products of the present invention, it is believed that these products produce other therapeutic effects when ingested by mammals. More specifically, it is believed that the products of the present invention can be effective in lowering glycemic index and as a laxative.

It will be understood that the specification and examples are illustrative of the present invention and that other embodiments within the spirit and scope of the invention will suggest themselves to those skilled in the art.

We claim:

1. A fiber-containing powdered drink mix comprising:

from about 1 to about 99% of an extruded psyllium-containing intermediate, said intermediate comprising, on a dry weight basis, from about 25 to about 99% by weight of a soluble fiber source comprising psyllium, and from about 1 to 75% by weight of an insoluble fiber source;

wherein said intermediate comprises a cooked and co-extruded agglomeration of said soluble fiber source and said insoluble fiber source, said agglomeration having a mean particle size ranging from about 30 to about 180 microns.

2. The powdered drink mix of claim 1, wherein said intermediate further comprises an edible acid.

3. The powdered drink mix of claim 2, wherein said soluble fiber source is selected from the group consisting of psyllium, a farinaceous grain, β-glucan, and mixtures thereof.

4. The powdered drink mix of claim 3, wherein said soluble fiber source is psyllium.

5. The powdered drink mix of claim 3, wherein said intermediate comprises from about 60 to about 80% psyllium.

6. The powdered drink mix of claim 2, wherein said edible acid is citric acid.

* * * * *